United States Patent Office 3,721,475
Patented Mar. 20, 1973

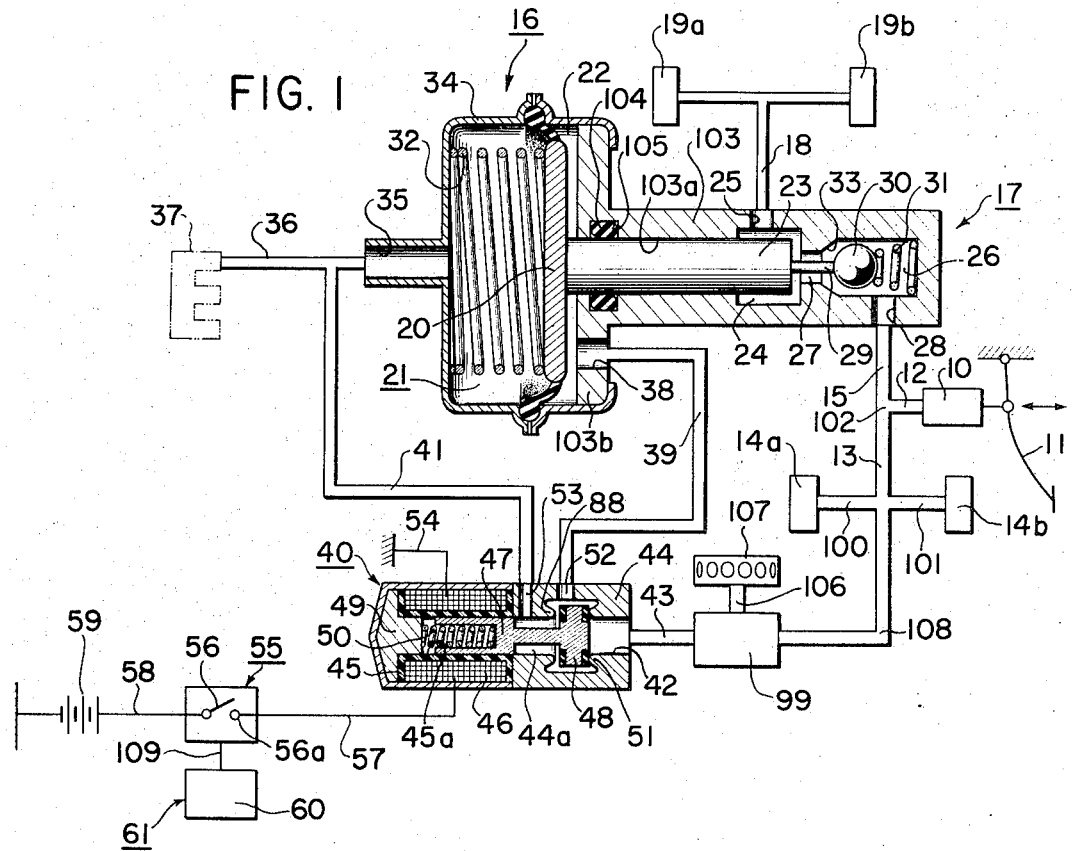

3,721,475
METHOD AND APPARATUS FOR THE CONTROL OF ANTISKID BRAKE SYSTEM FOR POWERED VEHICLES
Toshiharu Kawase, Toyota-shi, and Yukio Awakura, Aichi-ken, Japan, assignors to Aisin Seiki Company Limited, Toyota-shi, Japan
Filed Oct. 9, 1969, Ser. No. 865,091
Int. Cl. B60t 8/12
U.S. Cl. 303—21 F                            8 Claims

ABSTRACT OF THE DISCLOSURE

In a method and apparatus for antiskid control of a hydraulic brake system for powered vehicle wheels, the improvement comprises a sensor which senses occasional value of coefficient of adhesion appearing between said wheels and a road surface on which the wheels travel, said memoried value being taking into account for the modification of the hydraulic brake pressure in a sudden and considerable brake application.

This invention relates to an antiskid control method for vehicle braking system, and an apparatus adapted for carrying out same. More specifically, it relates to a process for effectively preventing vehicle slips or wheel skids as frequently and conventionally encountered in the case of a sudden and excess brake application, and an apparatus highly adapted therefor.

With the hydraulic brake system for vehicle wheels, it has already been proposed to reduce or even release the sudden and excess hydraulic brake pressure applied to the brake cylinders for said wheels, upon reception of an instruction signal, preferably an electrical one, issued from a skid sensor when the latter senses an impending or already invited locked condition of the wheels caused by the excess and undue braking thereof. This instruction signal is terminated when the wheels are once so conditioned by virtue of the aforementioned provisional release of excess hydraulic pressure in the above manner that they are now within a stabilizingly brakable range, thus allowing the hydraulic brake pressure to rise again. When the thus re-rosen hydraulic pressure attains a similar critical value for inviting again an impending or an already realized wheel lock condition, the hydraulic pressure release is again carried about for the same purpose, and so on. This kind of hydraulic pressure increase and decrease operations are repeated at a certain high frequency of repetition during the progress of a practical emergency braking operation. According to the conventional technique, the hydraulic pressure release is performed at a constant speed irrespective of the occasional coefficient of adhesion between the vehicle wheel and the road surface.

Now assuming that the vehicle wheel is braked on a road surface representing a high value of said coefficient which can be applied to concrete, asphalt or the like paved road surface and a reapplicaton of brake effort should be made, the results will be such that the hydraulic pressure release may be continued beyond the hydraulic brake pressure unliable to invite any wheel lock, thus causing an overrelease of braking pressure unnecessarily and uneconomically to take place. Of course, the braking period would be extended considerably from the optimal shortest value and against the will of the driver which means a dangerous drive of the vehicle, especially on an emergency.

On the contrary, when the vehicle is braked on an unfavorable road surface, representing a low value of adhesion coefficient, such hydraulic brake pressure could be applied which is liable to invite a wheel lock. Also, in this case, the practical braking period will become longer than the otherwise possible minimum. Such experiences are frequently encountered, especially when driving on snow-covered or muddy road surfaces.

It has been determined according to our practical experiments that the maximum coefficient of adhesion can be realized substantially in the range of slip ratio of 0.15–0.2. The slip ratio as used throughout the present specification is defined by the ratio of vehicle speed less the peripheral speed of vehicle wheel being divided by the vehicle speed. When the slip ratio be unity, wherein the vehicle wheel is in its slipping condition, the value of coefficient of adhesion will become considerably less than the optimum one of the nature above referred to.

It is therefore the main object of the invention to provide an improved technique for performing of the above kind of hydraulic pressure release by taking occasional value of coefficient of adhesion into account.

It is an object of the invention to provide an improved hydraulically braking technique by which the pressure release of the above kind is carried into effect in a slower speed for such road conditions as providing a high value of coefficient of adhesion, and vice versa.

It is a still further object of the invention to provide an improved hydraulically braking technique by which substantially a shortest possible braking period can be realized when necessary, especially on an emergency.

These and further objects, features and advantages of the invention will become more apparent, when read the following detailed description of the invention, to be set forth by reference to the accompanying drawings, in which:

FIG. 1 is a schematic representation of the hydraulic brake system embodying the principles of the invention, wherein however several more important constituents are shown in a more specific way and preferably in section.

FIG. 2 is a sectional view of a vehicle deceleration sensing mechanism employed in the arrangement shown in FIG. 1, wherein said sensing mechanism is coupled with a one way clutch mechanism acting as a kind of memory means.

FIG. 3 is a partial sectional view of part of the sensor assembly, being taken along a section line III—III shown in FIG. 2.

Figure 5:
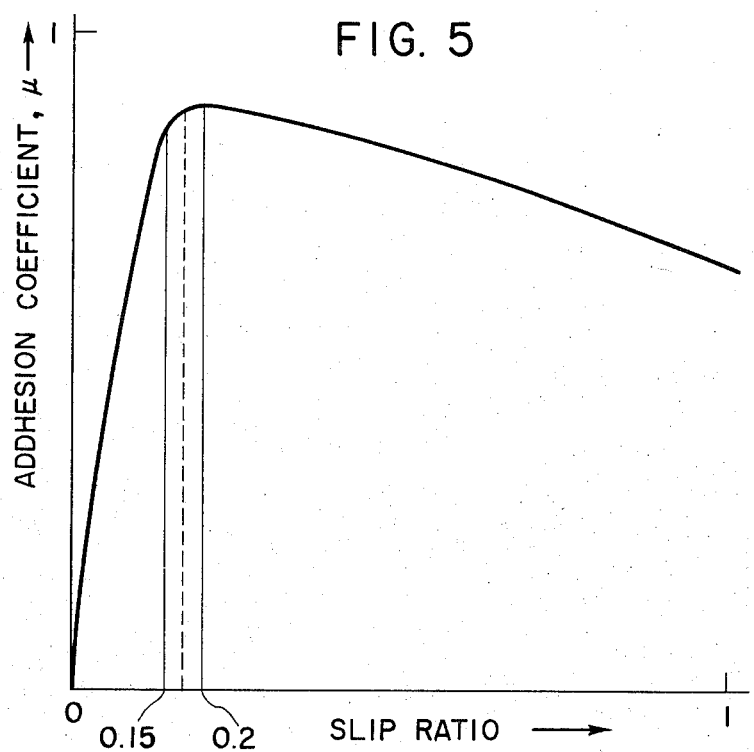
FIG. 5 is a chart on which a representative $\mu$–S curve is plotted wherein $\mu$ denotes the coefficient of adhesion and S represents the slip ratio.

Referring now to FIGS. 1–5 of the accompanying drawings, the first embodiment of the invention will be described in detail.

In FIG. 1, the numeral 10 denotes a conventional master cylinder assembly mechanically coupled with a manual brake actuator 11 formed preferably into a foot-operated brake pedal as shown, said master cylinder being shown only schematically by a block for the simplification of the drawing. The cylinder per se, not shown, of the assembly 10 is hydraulically connected through piping means 12 and 13 and piping branches 100 and 101 to conventional brake cylinders 14a and 14b, respectively, of front wheels of an automotive vehicle, not shown, these brake cylinders being shown in a highly simplified way by respective blocks on account of their very similarity among those skilled in the art.

From the junction 102 of piping means 12–13, a further piping 15 extends to an inlet port 28 of oil pressure control mechanism generally shown at 17 and fitted with a pneumatic servo mechanism 16.

Servo mechanism 16 comprises a housing 34 which is rigidly coupled through press fit or the like conventional attaching means with the cylinder 103 of said pressure control mechanism 17 as shown, said housing being fitted with a diaphragm piston 20. The interior space of the housing 34 is divided into two chambers 21 and 22 by the diaphragm piston 20 which is backed up by a return coil spring 32 provided in the chamber 21.

The diaphragm piston 20 is kept in pressure contact with a plunger 23 slidably received in the axial bore 103a of said cylinder 103, a sealing ring 104 being inserted in a circular recess 105 formed in the wall surface of said bore 103a for effectively sealing off the plunger 23. The right hand end of the bore 103a is formed into a hydraulic chamber 24, the inner end of said plunger projecting into the last mentioned hydraulic chamber. A port 25 is formed through the cylinder wall of the mechanism 17 so as to establish a permanent fluid connection between the chamber 24 and a piping 18 leading to conventional brake cylinders 19a and 19b, only shown in a highly simplified way, of rear wheels, not shown, of the automotive vehicle.

The cylinder 103 is further formed with a valve chamber 26 which is kept in fluid communication through a reduced passage 27 with said hydraulic chamber 24, on the one hand, and directly with said port 28, on the other hand. Valve chamber 26 contains a check ball 30 backed up by a return coil spring 31 tensioned between said ball and the corresponding inside wall surface of said cylinder 103. On the inside wall surface of this cylinder 103 at the part adjacent to the outer end of said reduced passage 27, there is formed a valve seat 33 shaped into a truncated cone so as to cooperate with said ball 30. The plunger 23 is formed with a concentrically reduced extension 29 protruding through said passage 27 normally into the valve chamber 26 for keeping the ball 30 away from the valve seat 33 under the action of said spring 32, thus opening the valve against the action of return spring 31.

The left hand chamber 21 of said servo mechanism 16 is kept in permanent fluid communication through an an opening or port 35 formed on the wall of housing 34, and a connection pipe 36 with a properly arranged vacuum source, such as an engine intake manifold 37 only schematically in FIG. 1. On the other hand, the right hand chamber 22 of the servo mechanism 16 is normally kept in fluid communication with the same vacuum source 37 through an opening or port 38 formed through the flange 103b of cylinder 103; conduit 39; electromagnetically operated air-vacuum transfer valve assembly 40; and conduits 41 and 36. The valve assembly 40 comprises a housing 44 which is formed through one of its end walls with a port 42 which is fluidically connected through a conduit 43 with a vehicle deceleration sensor 99, thence further through a piping 106 to a suction air cleaner 107 of the conventional design. On the other hand, the sensor 99 is kept in fluid communication through pipings 108, 13 and 12 wih the master cylinder 10. On the valve housing 44, a stationary bobbin member 45 is fixedly mounted, on which a solenoid coil 46 is mounted. The sensor 99 is of the conventional design, preferably of pendulum type, and shown in a highly simplified form by a rectangular block.

A plunger or armature member 47 is slidably mounted in the axial bore 45a of the bobbin 45 and made integral with a valve member 48, an urging spring 50 being tensioned between the armature 47 and a mounting member 49 which is positioned stationarily within the housing assembly 44. The valve member 48 is kept normally in cooperation with a valve seat 51 so as to close said port 42 under the influence of urging spring 50. Two ports 52 and 53 are formed through the wall of housing 44 and kept in fluid communication with connection pipings 39 and 41, respectively. Solenoid coil 46 is connected with its both ends to an earthed conductor 54 and to a further conductor 57 which is electrically connected with stationary contact 56a arranged to cooperate with a switch arm 56, the the latter being inserted in a computer 55 shown only in a simplified way by a block. The switch arm 56 is connected through a lead 58 with the positive side of battery 59, the negative side of the latter being earthed as shown. From the computer 55, a further lead 109 extends and is connected with a conventional skid sensor 60 which is designed and arranged for sensing an impending or an already realized locked conditions of automotive wheels and issuing an electrical instruction signal. In this case, the normally opened switch arm 56 is brought into its closed position.

A representative design of the aforementioned deceleration sensor 99 is shown more specifically in FIG. 2. This sensor comprises a housing 61 to which an end member 64 having an axial bore 62 is concentrically and fixedly attached, said bore being fluidically connected with said pipings 43 in FIG. 1. Spring 66 is mounted under pressure between the end member 64 and a stop member 65 which is slidably received in the interior space 61a of housing 61. A movable rod 68 is formed rigidly with a concentrically enlarged extension shaped into a cup 110 which is connected firmly through a tongue-and-groove connection 118 with said stop member 65. The rod 68 is formed at its opposite end with a reduced extension 68a which is provided at its free end with a resilient stop 69 for cooperation with the stem 72 of a freely suspended pendulum 70. The inside wall surface 111 of the cup 110 is always kept in separation from the outer peripheral surface of the reduced inner end part 64a of said end member 64. The top end of the stem 72 for the pendulum 70 is swiveled in the wall of housing 61 by means of a pivot pin 71 supported thereby.

A counter or balancing spring 76 is mounted under tension between movable stop member 65 and a separating wall 61b made integral with the wall of said housing 61. A fluid passage 77 is provided through said movable stop member 65 for establishing a permanent fluid passage between the both side spaces of the housing 61 separated from each other by the stopper-cup assembly 65 and 110. Port 63 is connected with said piping 106, although not specifically shown.

The numeral 78 represents generally a one way clutch assembly which is slidable laterally of the longitudinal axis of said housing and comprises a hollow and slidable cylinder member 120 having an inclined lower end edge 87. The wall of the hollow cylinder 120 is formed with a pair of oppositely arranged openings 79 and 80, the sizes and arrangement of the latter being so selected to allow the main part of said rod 68 to pass through with ample clearance. The slide cylinder 120 has an interior space 120a containing a slidable piston 83 and kept in fluid communication through an intermediate reduced passage 121 with an uppermost opening 81 which is kept in permanent fluid communication through piping 108 (FIG. 1) with the master cylinder 10. A pair of rollers 85 and 86 are mounted rotatably within the interior space of slide cylinder 120 by means of the respective roller shafts 85a and 86a which are supported at their both ends in the wall of the hollow cylinder 120, although the details of the bearing means have been omitted only for the simplicity of the drawing.

The upper roller 85 is kept is contact with the movable rod by upper pressure exerted by the piston 83 through the intermediary of slidable wedge piece 84 squeezed under pressure between said upper roller and said piston. The lower roller 86 is kept in pressure contact with the movable rod 68, on the one hand, and with the inside inclined bottom wall surface 87 of the slide cylinder. The second separation wall 61c is formed with a passage opening 122 for allowing axial movement of the rod 68. On account of the provision of a pair of the rightwardly reducing wedge surfaces 84a and 87 cooperating with the roller pair 85–86 kept in pressure rolling contact with the rod, the latter can be moved leftwards in FIG. 2 only with slightest possible resistance, yet substantially unable to move axially in the right hand direction.

In FIG. 2, there is shown an arrow F, representing the forwardly running direction of the vehicle. A dust-proof hood 123 is provided between the slide cylinder 120 and the housing 61 of the sensor assembly 99 for the prevention of otherwise possible invasion of foreign matters from outside into the interior of the housing 61.

The operation of the first embodiment of the invention so far shown and described is as follows:

In the stage of braking of the vehicle wheels, the working parts of the antiskid mechanism are positioned as shown in FIG. 1.

At this stage, vacuum pressure is supplied from the engine intake manifold 37 through piping 36 and port 35 to the left hand servo chamber 21. At the same time, some vacuum pressure is supplied from the intake manifold through pipings 36 and 41, port 53, valve space 44a, port 52, piping 39 and port 38 to the right hand servo chamber 22. Under the normal braking effort exerted by brake pedal 11 actuated manually by the vehicle operator, the pressurized oil delivered as conventionally from master cylinder 10 is supplied through pipings 12, 13 and thence through 100 and 101 to front wheel brake cylinders 14a and 14b, respectively. At the same time, the pressurized oil is delivered from master cylinder 10 through pipings 12 and 15, port 28, valve chamber 26, reduced passage 27, chamber 24, port 25 and piping 18 to rear wheel brake cylinders 19a and 19b. In this case, the normal braking action is brought about as commonly known among those skilled in the art.

When the vehicle operator exerts manually a sudden and considerable braking effort upon pedal 11 to such a degree that the sensor 60 is caused thereby to operate, switch arm 56 in the computer 55 is brought into contact with its mating stationary contact 56a, thus current is supplied from power source 59, conductor 58, the now closed switch unit 56–56a and conductor 57 to solenoid coil 46 of air control valve assembly 40, thereby energizing the solenoid 46. The armature 47 will thus be moved leftwards in FIG. 1 against the action of spring 50 and the valve 48 being separated from right hand seat 51 and brought into contact with the opposite valve seat 88. In this way, vacuum pressure coming from the engine intake manifold 37 will be interrupted from further conveyance through the now closed valve seat 88.

Atmospheric pressure air is now taken into from outside through air filter 107; conduit 106; passage bore 63 in sensor housing 61; space 61d containing spring 66; ring passage 113 defined between reduced extension 64a and inside wall of valve cup 110; ports 62; piping 43; port 42; the now opened valve seat 51; port 52; piping 39 and port 38 to the right hand servo chamber 22 (FIG. 1). Thus, a pneumatic pressure difference is established between both chambers 21 and 22 and diaphragm piston 20 is moved leftwards in FIG. 1 against the action of the return spring 32. By this leftward movement of diaphragm piston 20, the plunger will be also displaced leftwards, by virtue of the hydraulic pressure in chamber 24, check ball 30 following after this plunger movement under the action of spring 31, until the ball will have been brought into pressure contact with its valve seat 33, the hitherto established hydraulic connection between master cylinder 10 and rear wheel brake cylinders 19a and 19b being thereby interrupted. With further leftward movement of plunger 23 and thus, with corresponding increase of the volume of the hydraulic chamber 24, the hydraulic pressure supplied to the rear wheel brake cylinders are reduced or under occasions even released. With this sudden and considerable braking, the sensing pendulum 70 in the vehicle deceleration sensor 99 is swiveled in the forwardly running direction of the vehicle or more specifically in the left hand direction in FIG. 2, the rod 68 being thereby moved slidingly and correspondingly in the same direction. Since the return or right hand movement of the rod 68 is subjected to a considerable resistance as mentioned hereinbefore, the deviated degree of the pendulum and thus the leftwardly shifted stroke of the rod 68 which corresponds to the maximum degree of vehicle deceleration encountered at this stage is memoried in the one way clutch assembly 78.

By the leftward displacement of rod 68, the ring passage 113 formed between the inside cone surface 111 of cup-shaped valve member 110 and the outside cone surface on the reduced axial projection 64a of valve seat member 64 is reduced correspondingly in its cross-sectional area, thereby the inflow rate of atmospheric pressure air coming through passage bore 62 being also correspondingly reduced.

Figure 4:
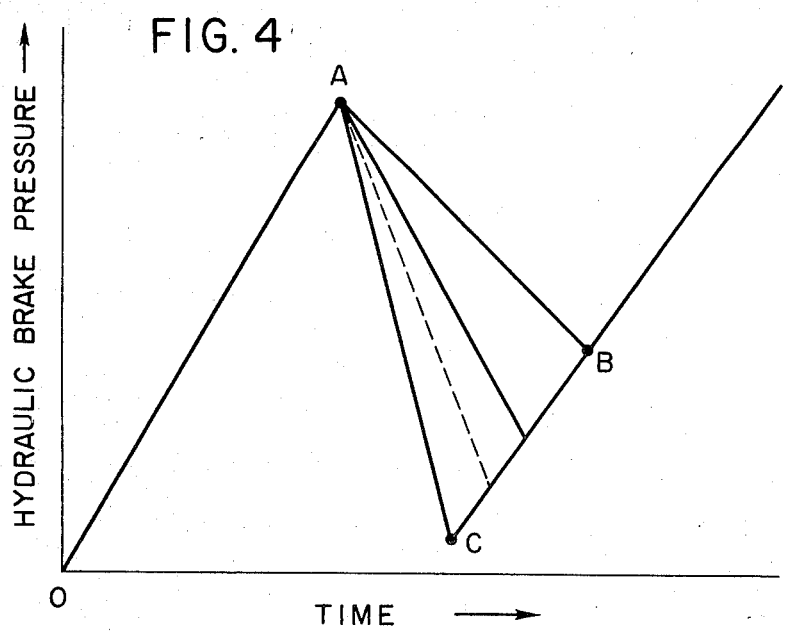
FIG. 4 is a chart on which a plurality of hydraulic brake pressure curves are plotted against time, yet in an illustrative and random way, so as to clearly show the variability of hydraulic pressure release course realized by the employment of the principles of the invention.

Now assuming that a considerably large vehicle deceleration should have occurred by a sudden and substantial braking effort applied on to the brake pedal 11 and that a substantial amount of swiveling action of pendulum 20 should take place in a corresponding degree towards the left, the ring passage 113 is reduced substantially as was referred to above, the inflow rate of air will be checked correspondingly in this place. In this way, only a comparatively small degree of increase of pressure difference between the both sides of diaphragm piston 20 will be invited. A curve A–B shown in FIG. 4 illustrates such a more considerably retarded hydraulic brake pressure releasing process.

On the contrary, when only a small degree of vehicle deceleration should have occurred, the leftward swiveling movement of the sensing pendulum 70 will be correspondingly small. Therefore, the thus resulted reduction of air flow passage 113 will become smaller. Under these conditions, the atmospheric pressure air coming from air cleaner 107 will be liable to invade into the chamber 22 in a more easy way than with a heavier vehicle deceleration. Therefore, in this case, the increase of pressure difference between the both sides of diaphragm piston 20 will progress in a more rapid way. The release of the hydraulic brake pressure will represent a more steep curve, as shown, by way of example, at A–C in FIG. 4, wherein a dotted line curve shows a representative operational curve taken as a reference. Curve O–A represents a representative curve showing a hydraulic brake application progress.

In FIG. 5, a chart of the μ-S diagram so called is shown, wherein the coefficient of adhesion, μ, has been plotted against the slip ratio, S. As seen, the coefficient amounts to a maximum for the slip ratio ranging between about 0.15–0.2. When the vehicle wheel locks, which means that the slip ratio is unity, the coefficient is considerably reduced from the attainable maximum value, as will be easily supposed from the chart. It is therefore highly advantageous, when the control mechanism is so designed and arranged that the hydraulic brake pressure is increased until the coefficient of adhesion reaches about 0.15–0.2 and then the pressure is reduced, and so on, since an increase of the hydraulic brake pressure beyond that corresponding to the above specified maximum value of coefficient of adhesion will result in a reduction of the effective braking function. With the present invention, it is aimed at that the hydraulic brake pressure is mainly applied in the optimum braking range above specified.

For the determination of the occasional coefficient of adhesion, it is substantially sufficient according to our experience to measure the vehicle deceleration at the desired time. For measuring in turn the vehicle deceleration, a pendulum type measuring instrument or sensor 99 is used in the foregoing embodiment which fact can be applied, indeed, to the following several embodiments.

Next, substantially referring to FIG. 6, the second embodiment of the invention will be described hereinbelow.

Figure 6:
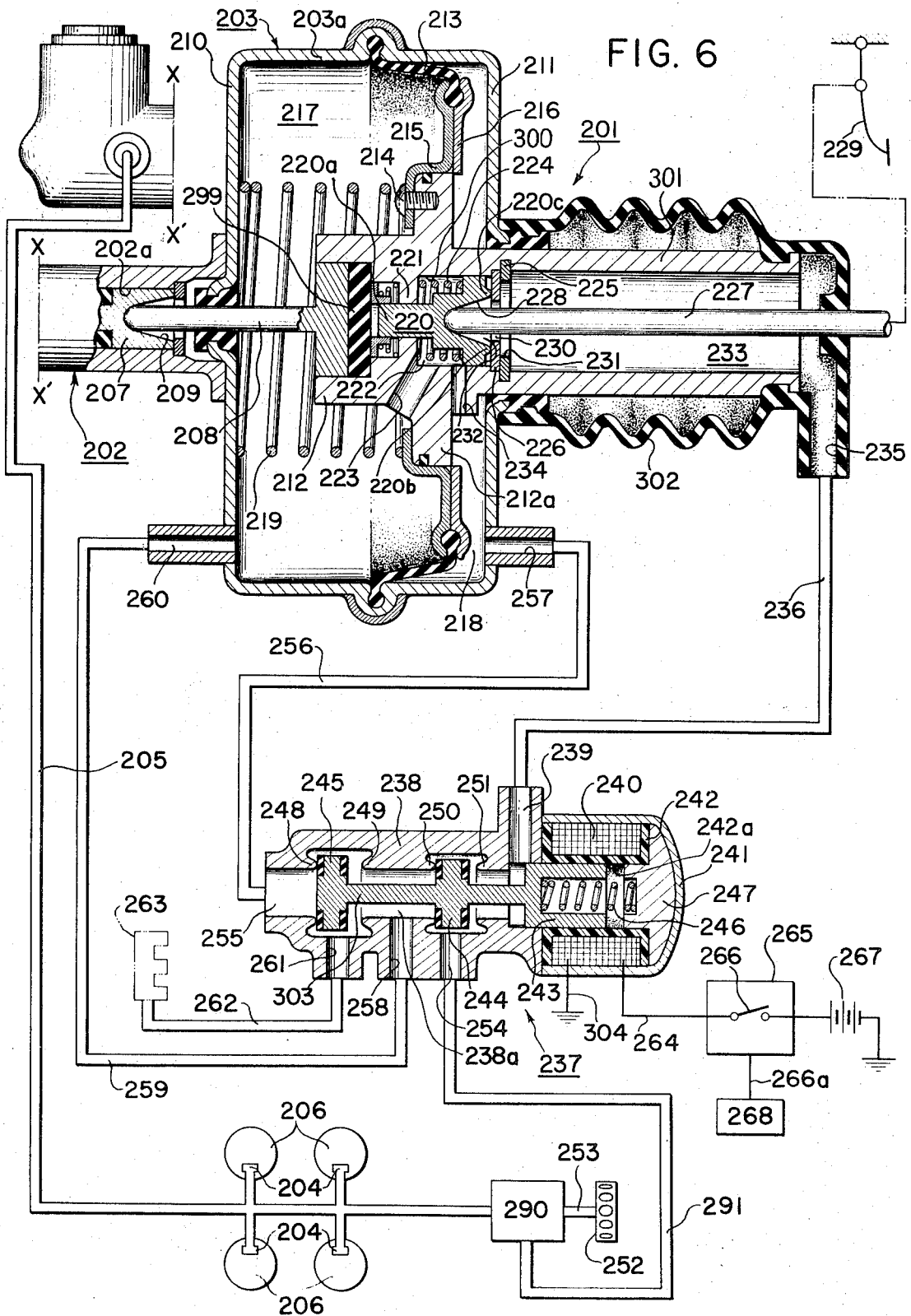
FIG. 6 is a schematic arrangement of the second embodiment of the invention, in a somewhat more specific manner in the case of FIG. 1.

In FIG. 6, the numeral 201 represents generally a brake booster unit comprising a master cylinder 202 and a servo mechanism 203 coupled therewith. Several wheel brake cylinders 204 of vehicle wheels 206 are hydraulically connected through conduit means 205 with a hydraulic chamber contained as conventionally in the master cylinder 202, although not specifically shown. A piston 207 is slidably received in the interior space 202a of the cylinder 202 and formed at its right hand end with a deep axial recess 209 kept in mechanical linkage with an actuator rod 208.

The servo mechanism 203 comprises a housing 203a representing front wall 210 and rear wall 211. Within the interior space of housing 203a, a power piston 212 is movably mounted and connected through a buffer member 299 with said actuator rod 208. The housing 203a comprises two elements made integral with front wall 210 and rear wall 211, respectively, the confronting surfaces of these housing elements squeeze positively and firmly the outer peripheral edge of flexible diaphragm 213 and fixture plates 215 and 216 shaped into respective rings and firmly united together grip the inner peripheral edge of said diaphragm in a positive way, the inner periphery of wider ring plate 215 is fixedly attached to the outer periphery area of the flange 212a of said power piston by means of a plurality of set screws 214, only one of which is shown however in FIG. 6. The interior space of the housing 203a is divided into two separate chambers 217 and 218 by the power piston thus constructed, said piston being urged rightwards resiliently by a coil spring 219 which is contained in the left hand chamber 217 and abuts against the front wall 210, on the one hand, and against the piston flange 212a, on the other.

The power piston 212 is formed axially with a complicatedly stepped bore 300 which receives slidably a valve piston 220 comprising a smaller piston element 220a and a larger piston element 220b. The power piston 212 is formed further with an inwardly projecting collar 221 which is kept in sliding contact with the smaller piston element 220a. A pneumatic chamber 222 is defined substantially by said collar 221 and the larger piston element 220b and kept in fluid communication through port 223 with the left hand servo chamber 217. Within the pneumatic ring chamber 222, there is provided a coil spring 224 which is mounted under pressure between said collar 221 and said larger piston element 220b, thereby the valve piston being urged resiliently towards right. Said valve piston is formed with a valving ring end surface 220c which is kept normally in pressure engagement with a valve seat disc 226 kept in position by means of a snap spring 225. A deep axial recess 228, the outermost extremity of the cone surface of this recess 228 being defined by said end surface 220c, receives the rounded left-hand end of piston rod or pusher 227, the right-hand end thereof being linked with brake pedal 229 which is similar to that shown in the foregoing embodiment by the numeral 11. For easy and unobstructed movement of the pusher 227, the valve seat disc 226 and snap ring 225 are formed respectively with central openings 230 and 231, respectively, providing thereby ample idle plays and thus the interior space 232 of the reception recess 228 being fluidically connected with the interior space 233 of a hollow concentrically cylindrical extension 301 of the power piston.

A radial port 234 is bored through the wall of power piston 212 so as to normally establish fluid communication between ring space 222 and servo chamber 218. A resilient hood 302 covers whole of said cylindrical extension 301 and is attached to the pusher 227 at its intermediate portion, so as to prevent foreign matters from invading into the cylinder space 233 from outside thereof. The hood 302 is formed with a port 235 communicating fluidically with the cylinder space 233 and connected with a piping 236 which leads to a port 239 formed radially through the wall of housing 238 of air-vacuum change-off valve 237. The housing 238 is formed with a multi-shouldered axial bore 238a which is kept in fluid communication with said port 239. To the housing 238, a cover 241 is fixedly attached and contains therein a stationary solenoid coil 240 wound on a bobbin 242 made of an insulating material. A core piece 247 is rigidly positioned within the cover as shown. A coil spring 246 is tensioned between core piece 247 and electromagnetic plunger 243 which is slidably mounted in the axial bore 242a of bobbin 242. One end of solenoid coil 240 is earthed through conductor 304, while the opposite end of the coil is connected through conductor 264 to a switch arm 266 adapted for cooperation with stationary contact 266a. This switch 266–266a is contained in the circuit of a computer 265 as before. Battery 267 and skid sensor 268 are designed and arranged in a similar way with the corresponding elements 55 and 60 shown in FIG. 1. The double piston member 303 is concentrically and rigidly united together with said electromagnetic plunger 243, said member 303 comprising two valve elements 244 and 245.

The valve element 244 acts as an air valve which cooperates selectively with a pair of oppositely arranged valve seats 250 and 251. The remaining valve element 245 acts as a vacuum valve which cooperates selectively with a further pair of oppositely arranged valve seats 248 and 249. By the provision of the urging spring 246, the plunger-double piston assembly 243; 303 is resiliently urged to move leftwards in FIG. 6 so that both valve elements 244 and 245 are kept in cooperation with respective left side seats 250 and 248, despectively.

Air cleaner 252 is connected fluidically through a piping 253 to a vehicle deceleration sensor 290, thence through a conduit 291 to a port 254 and kept normally in fluid connection with said port 239 through the valve gap normally defined as shown by and between said air valve 244 and its valve seat 251.

The housing 238 is formed further at its left hand end with a port 255 which is fluidically connected through a piping 256 with a port 257 permanently kept in fluid communication with the right hand servo chamber 218. A port 258 bored laterally through the wall of housing 238 and positioned between said valve seats 249 and 250 is fluidically connected through a piping 259 to the left hand servo chamber 217 of servo unit 203 through a port 260. The housing 238 is formed further with a port 261 which is fluidically connected through a piping 262 to a proper vacuum source shaped again in the form of an engine intake manifold 263, as only schematically shown.

The vehicle deceleration sensor shown only by the block 290 in FIG. 6 is completely similar in its design and arrangement with that shown in FIGS. 2 and 3 generally by the numeral 99 and the present embodiment can be well understood without further analysis of the sensor 290 in a repeated way. Therefore, the design and arrangement of the details of this sensor may well be omitted from further description.

The operation of the second embodiment so far shown and described is as follows.

Under the off-service conditions of the brake system, all the working parts are positioned as shown in FIG. 6. Under these conditions, vacuum pressure is conveyed from the engine intake manifold 263 through piping 262; port 261; bore passage 238a; port 258; piping 259 and port 260 into the left hand servo chamber 217. Vacuum pressure is further conveyed from the chamber through passage 223; ring space 222 and port 234 into the right hand servo chamber 218. Therefore, the power piston 212 of the servo unit 203 is exposed to the same negative pressure, thus generating no pneumatic pressure differential across the diaphragm piston which is therefore urged exclusively by the action of urging spring 219 towards right in FIG. 6.

When the vehicle driver exerts a regular braking effort upon the brake pedal 229, movement will be transmitted therefrom to pusher rod 227 which is thus moved leftwards in FIG. 6 against the action of spring 224, the valve piston 220 being accompanied to move in the same direction.

By this leftward displacement of valve piston 220, the hitherto maintained fluid communication between both servo chambers 217 and 218 through the passage 234 is interrupted by the larger part 220b of the valve piston. With further leftward displacement of valve piston 220, the interior space 232 defined by the axial recess 228 kept in permanent fluid communication of the cylinder space 233 is brought into fluid communication with right hand servo chamber 218 through connection passage 234. Thus ambient atmospheric air is taken through air cleaner 252, piping 253, sensor 290, piping 291, port 254, axial bore 238a, port 239, piping 236 and port 235 and so on into the chamber 218.

A pneumatic pressure difference will thus be established between both servo chambers 217 and 218 and the power piston 212 is suddenly shifted towards left against the action of spring 219 and thus, as known per se, the hydraulic pressure prevailing in master cylinder 202 being abruptly increased, so as to provide a highly boosted-up hydraulic brake pressure supplied to wheel cylinders 204 of vehicle wheels 206.

When the vehicle driver actuates the brake pedal 229 to such a sudden and substantial degree that an electric instruction signal is delivered from the computer 265 of the conventional design, switch arm 266 is thereby brought into electrical contact with its mating stationary contact 266a, the solenoid coil 240 being thereby energized. By the energization of this solenoid, its plunger 243 is attracted rightwards against the action of spring 246, so as to bring vacuum valve 245 and air valve 244 into pressure engagement with valve seats 249 and 251, respectively. Under these operating conditions, atmospheric air is taken from air cleaner 252 through the valve passage now formed between air valve 244 and valve seat 250; bore passage 238a; port 258, piping 259 and port 260 into the left side servo chamber 217 of the unit 203. At the same time, vacuum pressure is supplied from engine intake manifold 263 through the now established valve passage between vacuum valve 245 and valve seat 248; port 255; piping 256 and port 257 to the right side servo chamber 218 of the unit 203. Thus, a reversed operation to that appearing in the normal braking stage will be brought about.

As in the same way referred to above in connection with the first embodiment, the sensing pendulum 70, FIG. 2, is deflected from its neutral position shown and leftwards depending on the occasionally exercised degree of braking. In this way, the maximum deceleration degree is kept in memory by the one-way clutch mechanism 78, as was referred to hereinbefore.

The results of the function of the present embodiment is same as before. Thus, the functional advantages already mentioned by reference to FIG. 4 can be equally obtained without difficulty.

It will be clear from the foregoing that according to the invention the releasing speed of the hydraulic brake pressure as met in the progress of a sudden and considerable degree of braking in an antiskid hydraulic brake system is carried into effect or controlled in a variably adjusted way depending upon the occasionally realized maximum deceleration degree of the automotive vehicle, taking the variable coefficient of adhesion which varies with road surface conditions into account. By employing such measure, the braking progress can be adjusted or controlled in an amazingly improved manner, for the realization of a shortest possible braking period or distance, substantially irrespective of occasionally variable road surface conditions.

For the practical and economical determination of the coefficient of adhesion between vehicle wheels and the road surface on which the vehicle is running, other type of sensor can be adopted without sacrifice of the inventive effect. Thus, the sensor may sense the degree of braking reaction to which the vehicle wheels are subjected from the side of the road surface, and indeed, in place of the vehicle deceleration which was referred to hereinbefore.

Further referring to FIGS. 7–8, a third embodiment of the invention will now be described in detail.

Figure 7:
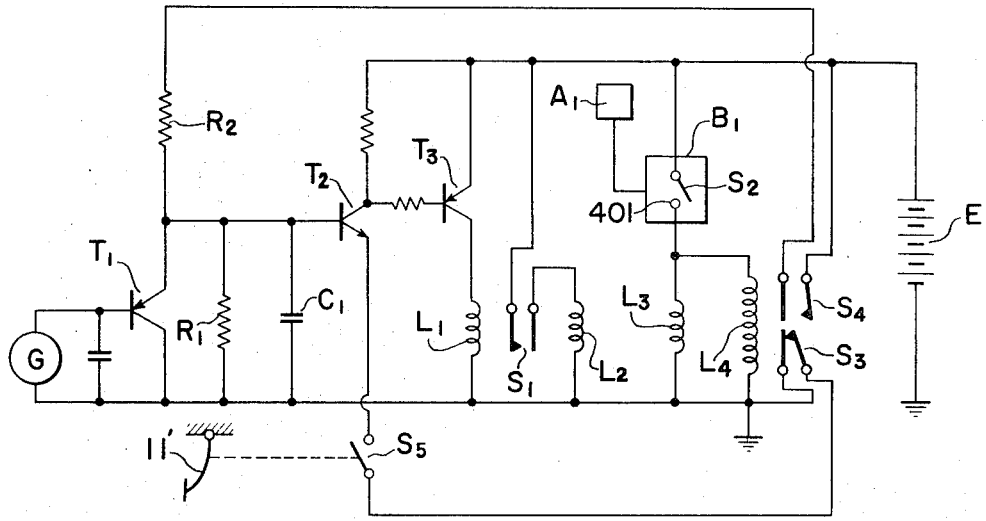
FIG. 7 is a simplified circuit schematic embodied in a third embodiment of the aparatus for carrying the method according to the invention.

In FIG. 7, G denotes in a simplified manner an angular acceleration detector which is operatively connected with one of the vehicle wheels for generating a variable voltage signal in response to the occasional angular acceleration of the vehicle wheel concerned, said signal being applied to the base electrode of transistor $T_1$ for amplification. This transistor is of such design that it provides a larger equivalent resistance for higher voltage signal applied thereto in response to the acceleration transmitted from the wheel to the detector, and vice versa. A transistor $T_2$ is designed and arranged in combination with a plurality of circuit elements such as resistor $R_1$, condenser $C_1$ and the equivalent resistance of said first transistor $T_1$ in such a way that it becomes conductive for a predetermined time period as determined by these circuit elements. When transistor $T_2$ becomes conductive, a still further transistor $T_3$ will be conductive on account of the electric connection of the base electrode of the latter with the collector electrode of the former. By the conductive energization of the third transistor $T_3$, relay $L_1$, one end of the latter being electrically connected with the collector electrode of the third transistor, is also energized, so as to close its relay contact $S_1$ which is electrically connected with a solenoid coil $L_2$ arranged to actuate a valve assembly 33, FIG. 7, adapted for increasing the hydraulic brake pressure, when energized. The energizing period of this solenoid $L_2$ is determined by said circuit elements: resistor $R_1$, condenser $C_1$ and the equivalent resistance of first transistor $T_1$, thus being equal to the conducting period of third transistor $T_3$. $A_1$ denotes a skid sensor which senses as before a lock-impending or locked condition of said vehicle wheel under consideration and delivers therefrom an electric instruction signal, when sensed, to a computer $B_1$. This computer contains a switch $S_2$ which is closed when the instruction is delivered to the computer. By closure of switch $S_2$, solenoid coil $L_3$ is also energized, this solenoid, when energized, being adapted for actuation of a valve assembly 40', FIG. 8, the latter being so designed and arranged, as will be described more fully hereinafter, as to reduce the hydraulic brake pressure. At the same time, a further relay coil $L_4$ is energized. By energization of this relay coil, its first relay switch $S_3$ is opened and its second relay switch $S_4$ is closed. By the closure of the last mentioned switch, the voltage as determined by the respective values of resistors $R_1$ and $R_2$ and the equivalent resistance of transistor $T_1$ is accumulated in condenser $C_1$. At this stage, second transistor $T_2$ is capable of current conducting, it is, however, not conductive in practice, on account of the open conditions of the third switch $S_3$.

During this pressure reducing period, a voltage in response to the occasional angular deceleration of the vehicle wheel is accumulated in condenser $C_1$. Upon de-energization of solenoid $L_3$ on account of termination of the instruction signal supplied thereto, the related pressure reducing valve assembly which has been kept in its actuating conditions by virtue of the delivery of the instruction signal delivered from the detector $A_1$, is brought into its off-service position, while third switch $S_3$ is closed and fourth switch $S_4$ is opened. E denotes a current source which delivers its current to the circuit shown in FIG. 7 for actuation of same. In the circuit, there is provided fifth switch $S_5$ which is mechanically linked in such a way that when the vehicle driver actuates manually a conventional foot-operated brake pedal 2, this switch is thereby closed.

Figure 8:
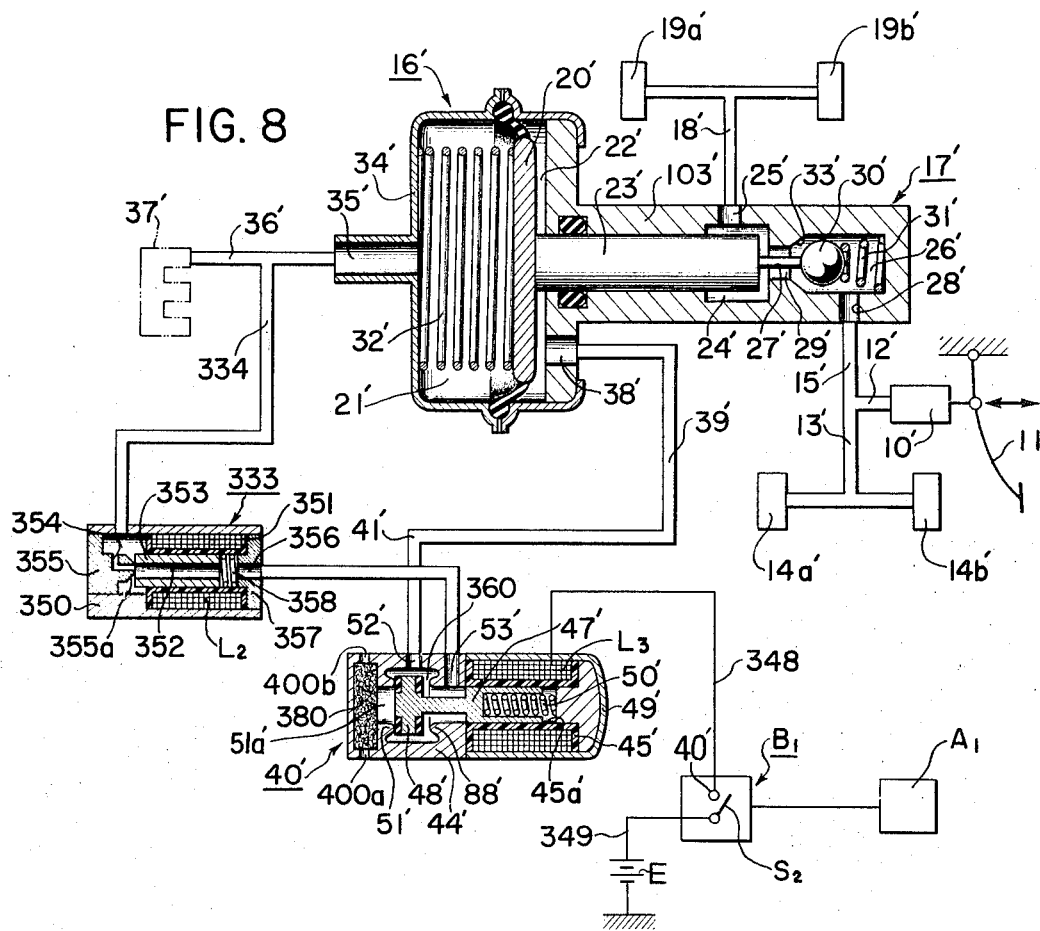
FIG. 8 is a schematic view of main working components, shown substantially in section, of the apparatus according to the third embodiment and adapted for cooperation with the electronic circuit shown in FIG. 7.

Next referring to FIG. 8, 10' denotes a conventional master cylinder shown in a simplified way by a block and is mechanically connected as before with the brake pedal 11'. The interior space of the master cylinder, acting as a hydraulic chamber, is fluidically connected with vehicle front wheel cylinders 14a' and 14b' through connecting pipings 12' and 13', as before.

The master cylinder 10' is fluidically connected through pipings 12' and 15' and port 28' to the valve chamber 26' of a hydraulic pressure controller 17', thence through passage 27', port 25' and piping 18' to vehicle rear wheel cylinders 19a' and 19b', said controller being fitted at its left and end in FIG. 8 with a conventional servo mechanism 16' comprising a housing 34', the interior space of which is divided into two separate chambers 21' and 22' by a diaphragm piston 20' movably mounted within the housing 34'.

A plunger 23' is kept in pressure contact with said diaphragm piston and received in the cylinder 103' of the controller 17', the free end of said plunger projecting into the hydraulic chamber 24'. This chamber is hydraulically connected through axial passage 27' to the valve chamber 26'. A reduced extension 29' is concentrically provided at the free end of said plunger and passes through said passage 27' with ample plays, the free end of said plunger extension being normally kept in pressure engagement with a check ball 30' under the action of an urging spring 31' and against the action of a counter spring 32'. A valve seat 33' is provided for cooperation with the check ball 30' which is however kept normally in separated condition from the mating valve seat. The urging spring 32' is contained in the chamber 21' and under pressure between the housing 34' and the diaphragm piston 20', thereby urging resiliently the combined diaphragm piston and plunger in the right hand direction in FIG. 8.

The right hand servo chamber 22' is fluidically connected through port 35' and conduit 36' to a vacuum source 37'. The chamber 22' is further connected normally and fluidically through port 38', piping 39', electromagnetically operated pressure reducing valve 40', piping 41', electromagnetically operated pressure increasing valve 333 and pipings 334 and 36' again to the vacuum source 37'.

The valve 40' comprises a housing 44' and a bobbin 45' positioned firmly therein, said solenoid coil $L_3$ being wound around said bobbin. A plunger 47' is slidably mounted in the axial bore 45a' of said bobbin, a valve member 48' being rigidly coupled physically with said plunger. Spring 50' is tensioned between core piece 49' and said plunger 47', thereby the valve member being normally kept in pressure engagement with a valve seat 51'. Core piece 49' is held firmly within the housing 44' which is formed with communication ports 52' and 53' and further with air inlet ports 400a and 400b. Ports 52' and 53' are kept in fluid communication with respective connecting pipings 39' and 41', respectively.

One end of solenoid coil $L_3$ is electrically connected with a lead 348 leading to a stationary contact 401 adapted for cooperation with switch $S_2$, the latter being connected through a lead 349 to the positive pole of the current source E, while the negative pole of the latter is earthed, as shown. The detector $A_1$ is designed as conventionally as to provide an instruction signal, as was referred to above, when it senses the rotational variation of the vehicle wheel should exceed beyond a predetermined value. Since the detector is so electrically connected with the switch $S_2$, the generated instruction signal is delivered to the computer for closing the switch.

The valve assembly 333 is positioned between the pipings 41' and 334 and comprises a housing 350 which has a bobbin 351 made of non-magnetic material and positioned firmly therein. Coil $L_2$ referred to above is wound on the bobbin 351 having a longitudinal bore for receiving slidably a hollow plunger 353. This plunger 353 has an axial bore 352 serving as a fluid passage to be described. A stationary end member 355 is firmly positioned and made integral with the cylindrical housing 350 of the assembly 333, an orifice 354 being formed at the inner end of said end member. At the opposite end of said housing 350, there is provided a core piece 357 made integral therewith and serving simultaneously as a positioner for said bobbin 351, said core piece being formed with an axial bore 356 serving as a fluid passage to be described. An urging coil spring 358 is tensioned between said core piece 357 and plunger 353 for urging resiliently the latter in the left hand direction in FIG. 8 and bringing normally the bored plunger into physical engagement with a coned projection 355a formed on the end member 355.

The operation of the third embodiment shown in FIGS. 7–8 is as follows.

Under the off-service conditions of the braking system fitted with the control arrangement according to this invention, all the working parts are positioned as shown.

When the vehicle driver actuates the pedal 11' for the actuation of the brake system, pressurized oil is delivered as usually from the master cylinder 10' through pipings 12' and 13' to front wheel cylinders 14a' and 14b'. Simultaneously, pressurized oil is delivered from the same master cylinder 10' through pipings 12' and 15', port 28', valve chamber 26', reduced extension 29', passage 27', chamber 24', port 25' and piping 18' to rear wheel cylinders 19a' and 19b'. This is a normal braking mode.

On the contrary, when the driver applies a sudden and considerable braking effort on the brake pedal in such manner that the resulted hydraulic pressure output from the master cylinder is considerably high and detector $A_1$ is thereby brought into operation, switch $S_2$ in the computer $B_1$ is closed, as was briefly referred to above, and solenoid coil $L_3$ is energized. Plunger 47' is moved thus in the right hand direction against the action of spring 50' and the valve member 48' is separated from the hitherto contacted seat 51' and brought into pressure engagement with oppositely arranged valve seat 88'. Thus, a valve transfer is brought about.

By virtue of this valve transfer, vacuum pressure conveyed from the engine intake manifold 37' is interrupted at the now closed valve seat 88', while ambient atmospheric air is introduced through inlet ports 400a and 400b, filter mass 380, passage 51a', now opened valve seat 5'1', valve chamber 360, port 52', piping 39' and port 38' into the right hand servo chamber 22', a considerable pressure difference being established thereby across the diaphragm piston 20' and the latter being moved suddenly to the left in FIG. 8 against the action of spring 32'. By this leftward displacement of the diaphragm piston 20' accompanying the plunger 23', check ball 30' is brought into pressure engagement with valve seat 33' under the action of the urging spring 31', so as to interrupt the hitherto established hydraulic communication between master cylinder 10' and rear wheel cylinders 19a' and 19b'.

With further leftward displacement of plunger 23', the effective volume of chamber 24' will be still increased, thereby reducing the hydraulic brake pressure supplied to the rear wheel cylinders. When the rotational speed of vehicle rear wheels is recovered by virtue of the thus reduced brake applying pressure to that corresponding to the occasional vehicle running speed or an acceleration is invited in the rotation of these wheels, switch $S_2$ of computer $B_1$ is caused to open to de-energize solenoid coil $L_3$. Then, plunger 47' is returned leftwards under the action of spring 50' to the position shown in FIG. 8. Under these operating conditions, circuit components shown in FIG. 7 will return to the position shown therein. In this case, switch $S_3$ is closed and second transistor $T_2$ will become conductive. When it is now assumed that a considerable amount of angular acceleration is occurred in the vehicle wheels, the equivalent resistance of first transistor $T_1$ will become larger and the time constant as determined by the combination of resistance $R_1$, capacitance $C_1$ and said equivalent resistance will naturally be increased so that the charge accumulated at $C_1$ will become more difficult to discharge, thus the conducting period of second transistor $T_2$ being correspondingly elongated. The energization period of solenoid $L_2$ in the brake pressure increasing valve assembly 333 will be correspondingly increased, so as to increase more suddenly the braking pressure. More specifically, in this case, the period in which the plunger 353 is attracted towards right against the action of spring 358, thus keeping a valve passage between the left hand end of plunger 353 and the end member 355. Thus, the atmospheric pressure prevailing in the right hand servo chamber 22' upon de-energization of third solenoid coil $L_3$ in the pressure reducing valve assembly 16', will be released suddenly from the related servo chamber through port 28', piping 39', port 52', valve chamber 360, port 53', piping 41', port 356, passage 352, the now maintained valve passage at 355a, pipings 334 and 36' to the suction manifold 37'.

Upon later de-energization of second transistor $T_2$, solenoid $L_2$ will become also de-energized, thus the working parts of hydraulic pressure increasing valve assembly will recover to their initial position shown in FIG. 8. Therefore, the atmospheric pressure now prevailing in the right-hand servo chamber 22' will be sucked rather slowly through the orifice 354 formed in end member 355, so as to increase the hydraulic brake pressure at a substantially slower rate, and so on.

In all of the foregoing embodiments, the determination of the coefficient adhesion is carried out by the measurement of vehicle deceleration degree. Although not shown, however, similar object can be satisfied to measure the degree of reaction imposed on the vehicle wheels from the road surface in case of the sudden and considerable brake application. According to our experiments, this kind of reaction varies substantially depending upon the coefficient of adhesion in the above sense and regardless of the degree of the brake application.

The embodiments of the invention in which as exclusive property or privilege is claimed are as follows:

1. A hydraulically actuated antiskid vehicle wheel brake system comprising, a hydraulic master cylinder, a wheel brake actuating cylinder, a hydraulic brake circuit communicating said master cylinder with said wheel cylinder, sensor means for sensing a substantially locked condition of the wheel being braked, said sensor means generating an instruction signal in response to the sensed locked condition, a servo means connected in said hydraulic circuit for interrupting the flow of hydraulic fluid therethrough and for increasing the volume in said circuit communicating with said wheel cylinder in response to said instruction signal for decreasing the hydraulic brake pressure being applied to said wheel cylinder, and control means, including one-way clutch means, for constantly and automatically varying the rate of actuation of said servo means adapted for increasing the effective volume of said circuit, said control means and one-way clutch means being operatively connected with said servo means and responsive to the rate of maximum deceleration of the vehicle being braked, said one-way clutch means being engageable in a position representing said rate of maximum deceleration for controlling the rate of movement of said servo means, said rate of deceleration representing a pseudo-coefficient of adhesion between the vehicle wheel and the road surface on which the vehicle is travelling.

2. A hydraulically actuated antiskid vehicle wheel brake system as claimed in claim 1, wherein said servo means further comprises, a housing having a cavity therein, a diaphragm piston movably mounted in said cavity and forming a first and a second chamber therein, a first conduit means for communicating said first and second chambers with a vacuum source, a second conduit means adapted for communicating said second chamber with ambient atmosphere, an air change-off valve connected to said first and second conduit means, said air change-off valve having a first position for maintaining communication of said second chamber with said vacuum source and a second position for blocking communication of said second chamber with said vacuum source and communicating said second chamber with said second conduit, said air change-off valve operatively connected to said sensor and being moved to said second position in response to said instructional signal, said control means and said one-way clutch means being connected in said second conduit means between said change-off valve and the ambient atmosphere and adapted for throttling air passage through said second conduit means to said second chamber in response to the sensed pseudo-coefficient of adhesion between the vehicle wheel and the road surface represented by the engaged position of said one-way clutch means to vary the rate of movement of said diaphragm piston.

3. A hydraulically actuated antiskid vehicle wheel brake system as claimed in claim 2, wherein said control means further comprises, (1) a main body
(2) a weight mass pivotably attached to said main body
(3) a first valve means fixedly attached to said main body
(4) a second valve means adapted for sliding in said main body in response to the movement of said weight mass, said second valve means cooperating with said first valve means for throttling air flow passage from the atmosphere to said one chamber through an air cleaner.

4. A hydraulically actuated antiskid vehicle wheel brake sys tem as claimed in claim 3, wherein said one-way clutch means is mounted on said main body of said control means and communicating with said hydraulic brake circuit, said clutch means being slidable upon reception of the master cylinder pressure, said second valve means comprising a valve element adapted for cooperation with said first valve means to vary the opening of said second conduit means for throttling said air flow passage from the atmosphere, said control means further comprising an actuating shaft having one end connected with said valve element and passing through said clutch means, the other end of said actuating shaft being operatively connected with said weight mass, said second valve means being adapted to shift only in such direction as to throttle said second conduit means during actuation of said clutch means.

5. A hydraulically actuated antiskid vehicle wheel brake system comprising, a master cylinder, a wheel cylinder, a hydraulic brake circuit communicating between said master cylinder and said wheel cylinder, a sensor adapted for sensing a substantially locked condition of the wheel and for delivery of an instruction signal in response thereto, a servo means for increasing the hydraulic brake pressure delivered from said master cylinder, said servo means being adapted for controlling the effective volume of said circuit in response to said instruction signal to increase or decrease the hydraulic brake pressure, and control means, including a one-way clutch means, for constantly and automatically varying the rate of actuation of said servo means adapted for increasing the effective volume of said circuit, said control means and one-way clutch means being operatively connected with said servo means and responsive to the rate of maximum deceleration of the vehicle being braked, said one-way clutch means being engageable in a position representing said rate of maximum deceleration to control the rate of actuation of said servo means, said rate of deceleration representing a pseudo-coefficient of adhesion between the vehicle wheel and the road surface on which the vehicle is travelling.

6. A hydraulically actuated antiskid vehicle wheel brake system as claimed in claim 5, wherein said servo means further comprises a housing having a cavity therein, a diaphragm piston movably mounted in said cavity and forming a first and a second chamber therein, a first conduit means for communicating said first and second chambers with a vacuum source, a second conduit means adapted for communicating said first chamber with ambient atmosphere, an air change-off valve connected to said first and second conduit means, said air change-off valve having a first position for maintaining communication of said first chamber with said vacuum source and a second position for blocking communication of said first chamber with said vacuum source and communicating said first chamber with said second conduit, said air change-off valve operatively connected to said sensor and being moved to said second position in response to said instruction signal, said control means being connected in said second conduit means between said change-off valve and the ambient atmosphere and being positioned by said one-way clutch means for throttling air passage through said second conduit means to said first chamber in response to the sensed pseudo-coefficient of adhesion between the vehicle wheel and the road surface to vary the rate of movement of said diaphragm piston.

7. A hydraulically actuated antiskid vehicle wheel brake system as claimed in claim 6, wherein said servo means further comprises a valve means adapted for actuation in response to the movement of a brake pedal, third conduit means adapted for bringing a fluid communication between said first and second chambers, and a fourth conduit means adapted for bringing said second chamber into fluid communication with a third chamber normally kept in fluid communication with the open atmosphere, said third conduit means being brought in its interrupted state upon actuation of said brake pedal while said fourth conduit means is brought into its opened or communicating state, said change-off valve being adapted for bringing said first chamber into fluid communication with the ambient atmosphere upon reception of said instructional signal while said second chamber is brought into fluid communication with said vacuum source, thereby said control means being adapted for throttling air passage flow from atmosphere to said first chamber.

8. A hydraulically actuated antiskid vehicle wheel brake system as claimed in claim 6, wherein said control means further comprises a main body, a weight mass pivotably attached thereto, a first valve means fixedly attached thereto, a second valve means slidable in said main body in response to shifting movement of said weight mass and adapted for varying air flow passage from the atmosphere to said first chamber, said one-way clutch means being slidable relative to said main body and under the influence of the master cylinder pressure, said second valve means cooperating with said first valve means and passing through said clutch means for sliding only in the throttling direction of said air flow passing under the influence of said clutch means.

References Cited

UNITED STATES PATENTS

| | | | |
|---|---|---|---|
| 3,527,504 | 9/1970 | Chovings et al. | 303—21 A |
| 3,401,987 | 9/1968 | Horvath | 303—21 F |
| 3,608,982 | 9/1971 | Inada et al. | 303—21 F |
| 3,525,553 | 8/1970 | Carp et al. | 303—21 P |
| 3,415,577 | 12/1968 | Walker | 303—21 F |
| 3,494,671 | 2/1970 | Slavin et al. | 303—21 P |

MILTON BUCHLER, Primary Examiner

J. J. McCLAUGHLIN, Assistant Examiner

U.S. Cl. X.R.

188—181 A; 303—21 CG

UNITED STATES PATENT OFFICE
CERTIFICATE OF CORRECTION

Patent No. 3,721,475  Dated March 20, 1973

Inventor(s) Toshiharu Kawase et al

It is certified that error appears in the above-identified patent and that said Letters Patent are hereby corrected as shown below:

In The Heading:

The Priority Date was omitted. Should read:

| --Japan | October 11, 1968 | 74483/1968 |
| Japan | November 16, 1968 | 83953/1968 |
| Japan | December 5, 1968 | 89264/1968-- |

Signed and sealed this 27th day of November 1973.

(SEAL)
Attest:

EDWARD M. FLETCHER, JR.　　　　RENE D. TEGTMEYER
Attesting Officer　　　　　　　　Acting Commissioner of Patents